(12) United States Patent
Oberle

(10) Patent No.: US 8,089,376 B2
(45) Date of Patent: Jan. 3, 2012

(54) RFID BASED KEYBOARD

(75) Inventor: Robert R. Oberle, Macungie, PA (US)

(73) Assignee: RCD Technology Inc

( * ) Notice: Subject to any disclaimer, the term of this patent is extended or adjusted under 35 U.S.C. 154(b) by 884 days.

(21) Appl. No.: 12/131,694

(22) Filed: Jun. 2, 2008

(65) Prior Publication Data

US 2009/0128337 A1    May 21, 2009

Related U.S. Application Data

(60) Provisional application No. 60/988,658, filed on Nov. 16, 2007.

(51) Int. Cl.
*H03M 11/00* (2006.01)
(52) U.S. Cl. .......................................... 341/22

(58) Field of Classification Search .................. 341/22
See application file for complete search history.

(56) References Cited

U.S. PATENT DOCUMENTS

| 6,903,662 | B2 * | 6/2005 | Rix et al. ................. 341/22 |
| 7,006,014 | B1 * | 2/2006 | Henty ...................... 341/22 |
| 7,157,651 | B2 * | 1/2007 | Rix et al. ................. 200/5 A |

* cited by examiner

*Primary Examiner* — Stephen W Jackson
(74) *Attorney, Agent, or Firm* — Fliesler Meyer LLP

(57) ABSTRACT

An RFID keyboard comprising a base with a first antenna and; keys with secondary antennas wherein a key is normally in a first position such that the resonant frequency is away from an interrogation frequency and no signal for the key is detected and wherein when the key is depressed, the secondary antenna for the key and the first antenna become adjacent such that the resonant frequency shifts such that information identifying the key is transferred.

24 Claims, 3 Drawing Sheets

RFID BASED KEYBOARD

CLAIM OF PRIORITY

This application claims priority to U.S. Provisional Application No. 60/988,658 entitled "RFID BASED KEYBOARD" filed Nov. 16, 2007, which is incorporated herein by reference.

BACKGROUND

The present invention relates to the use of Radio Frequency ID (RFID) tag systems.

DETAILED DESCRIPTION

One embodiment comprises RFID keyboard 102 comprising a base with a first antenna and keys 108 with secondary antennas.

Figure 1:
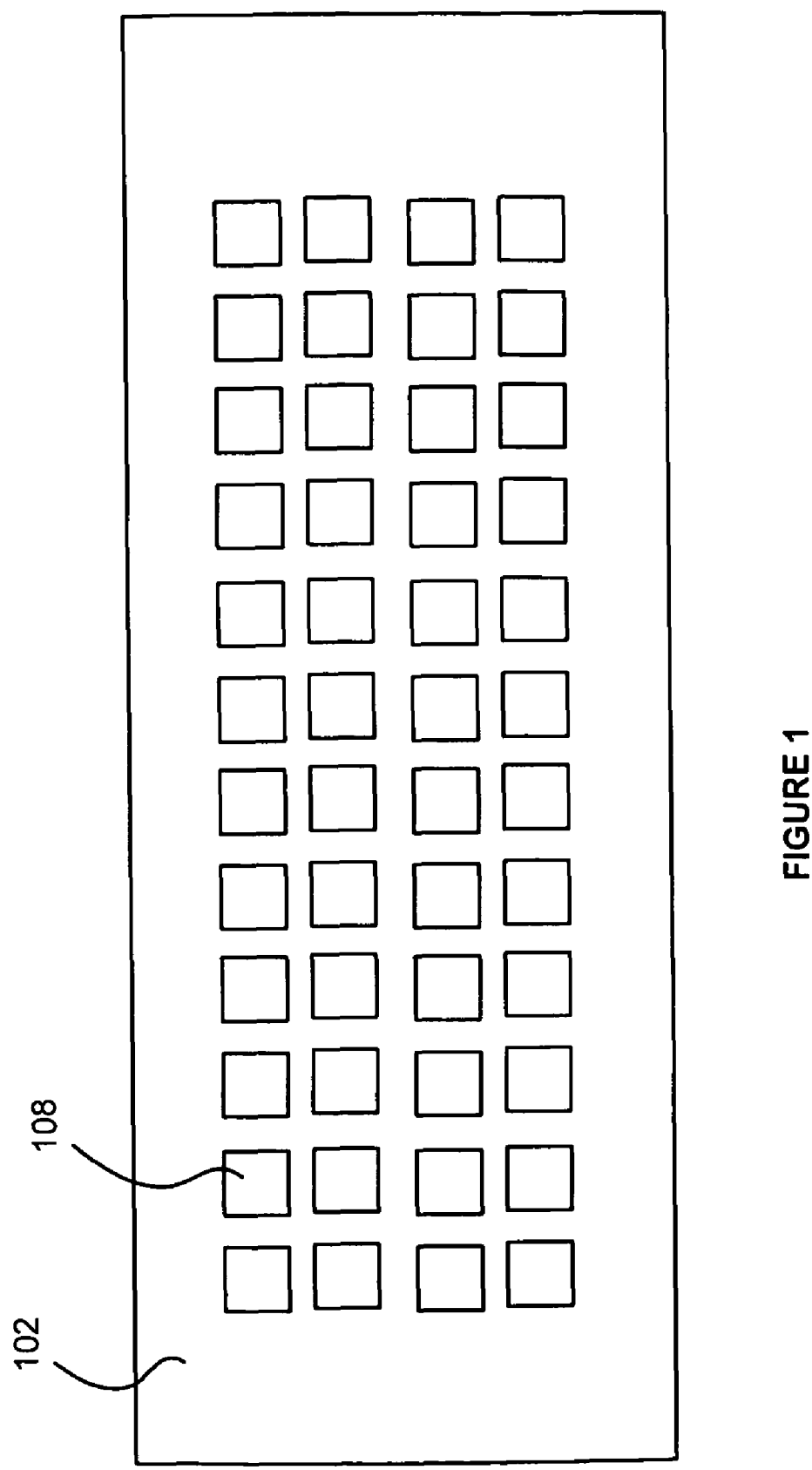
FIG. 1 shows a RFID keyboard of one embodiment of the present invention.
Figure 2A:
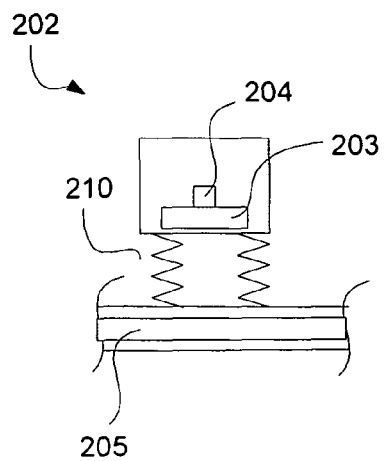
FIGS. 2A and 2B show a RFID key of one embodiment of the present invention.
Figure 2B:
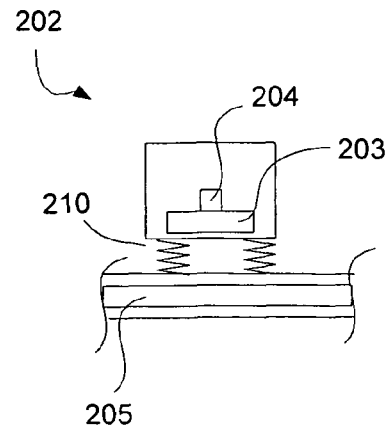

A key can normally be in a first position shown in FIG. 2A, such that the resonant frequency of the key is away from an interrogation frequency and no signal for the key is detected. As shown in FIG. 2B, when key 202 is depressed, the secondary antenna 203 for the key and the first antenna 205 can become adjacent such that the resonant frequency shifts and information identifying the key 202 is transferred.

Multiple keys can be selected at the same time.

The secondary antennas can be associated with RFID chips 204 containing identification information for the keys.

Some keys can be associated with letters of an alphabet.

In one embodiment, the keyboard can be rearranged as the user desires.

The keys can be independently movable.

The keys can have an element 210 that biases the secondary antennas away from the first antenna. The element 210 can be a spring.

One embodiment is a system comprising a base with a first antenna and units with secondary antennas wherein a unit is normally in a first position such that the resonant frequency is away from an interrogation frequency and no signal for the unit is detected and wherein when the unit is depressed, the secondary antenna for the unit and the first antenna become adjacent such that the resonant frequency shifts such that information identifying the key is transferred.

Figure 3A:
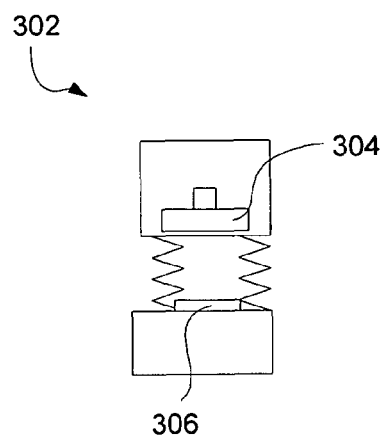
FIGS. 3A and 3B show a RFID key of another embodiment of the present invention.
Figure 3B:
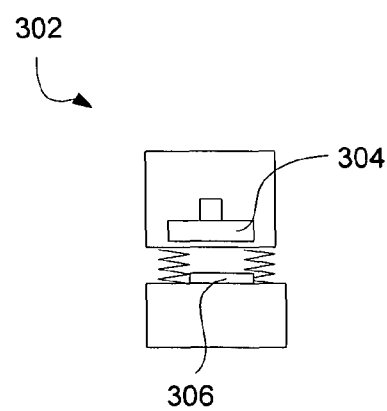

FIGS. 3A and 3B shows an embodiment where the first 306 and second 304 antennas are part of a key.

A key can be normally in a first position such that the resonant frequency is away from an interrogation frequency and no signal for the key is detected and wherein when the key is depressed, the first 306 and secondary 304 antenna for the key 302 can become adjacent such that the resonant frequency shifts such that information identifying the key is transferred.

Figure 4:
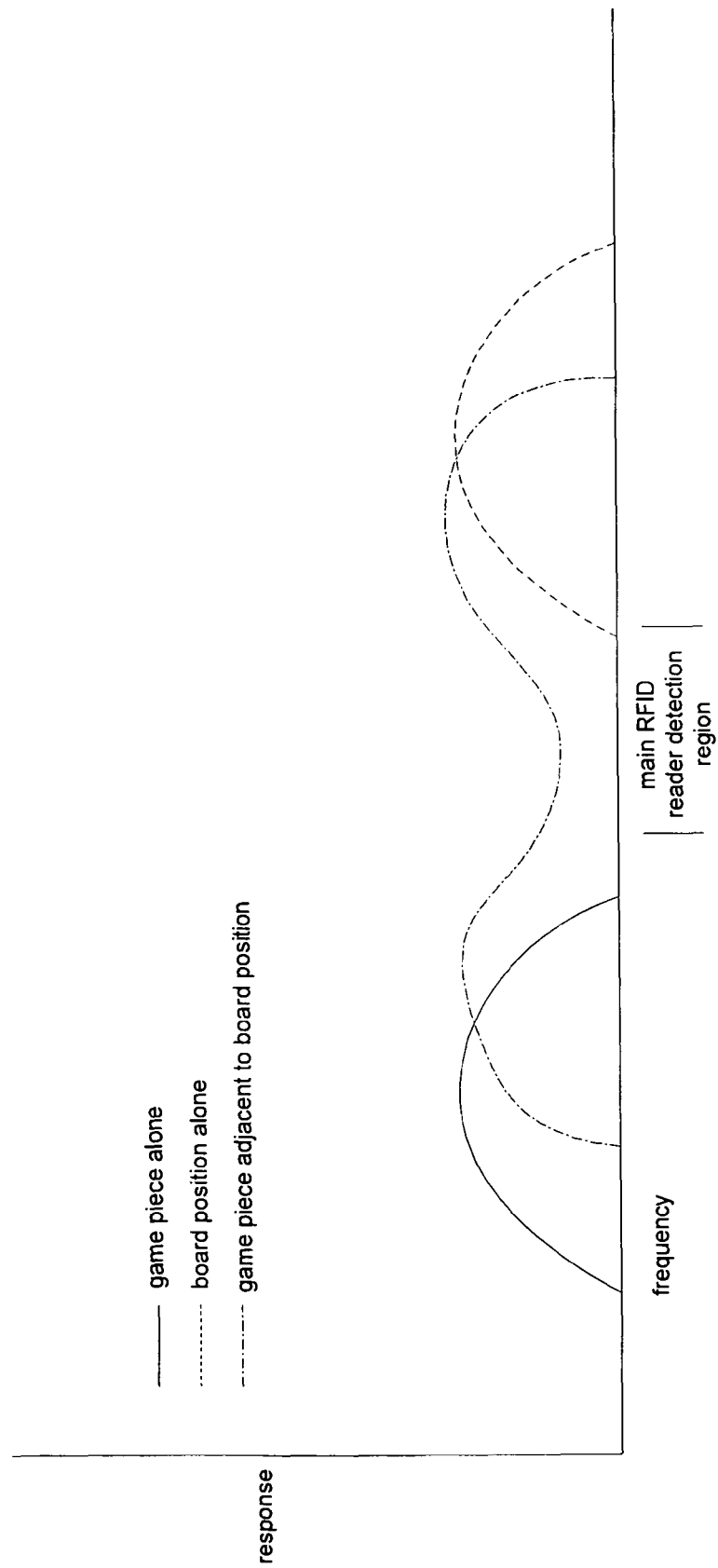
FIG. 4 is a graph that illustrates a hypothetical shifting of resonant features for a key of one embodiment.

In one embodiment, the response characteristics can be shifted such that the RFID response within antenna frequency detection range. FIG. 4 shows a hypothetical example where the adjacent positioning of the RFID antennas causes a shift in response frequency.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. A Radio Frequency Identification keyboard comprising:
   a base with a first antenna and;
   keys with secondary antennas wherein a key is normally in a first position such that the resonant frequency is away from an interrogation frequency and no signal for the key is detected and wherein when the key is depressed, the secondary antenna for the key and the first antenna become adjacent such that the resonant frequency shifts such that information identifying the key is transferred.

2. The RFID keyboard of claim 1, wherein multiple keys can be selected at the same time.

3. The RFID keyboard of claim 1, wherein the secondary antennas are associated with RFID chips containing identification information for the keys.

4. The RFID keyboard of claim 1, wherein some keys are associated with letters of an alphabet.

5. The keyboard of claim 1, wherein the keyboard can be rearranged as the user desires.

6. The keyboard of claim 1, wherein the keys are independently movable.

7. The keyboard of claim 1, wherein the keys have an element that biases the secondary antennas away from the first antenna.

8. The keyboard of claim 1, wherein the element is a spring.

9. A system comprising:
   a base with a first antenna and;
   units with secondary antennas wherein a unit is normally in a first position such that the resonant frequency is away from an interrogation frequency and no signal for the unit is detected and wherein when the unit is depressed, the secondary antenna for the unit and the first antenna become adjacent such that the resonant frequency shifts such that information identifying the key is transferred.

10. The system of claim 9, wherein units are keys of a keyboard.

11. The system of claim 9, wherein multiple units can be selected at the same time.

12. The system of claim 9, wherein the secondary antennas are associated with RFID chips containing identification information for the units.

13. The system of claim 9, wherein some units are associated with letters of an alphabet.

14. The system of claim 9, wherein the units are independently movable.

15. The system of claim 9, wherein the units have an element that biases the secondary antennas away from the first antenna.

16. The system of claim 9, wherein the element is a spring.

17. A Radio Frequency Identification keyboard comprising:
   keys with first and secondary antennas, wherein a key is normally in a first position such that the resonant frequency is away from an interrogation frequency and no signal for the key is detected and wherein when the key is depressed, the first and secondary antenna for the key and become adjacent such that the resonant frequency shifts such that information identifying the key is transferred.

18. The RFID keyboard of claim 17, wherein multiple keys can be selected at the same time.

19. The RFID keyboard of claim 17 wherein the keys include RFID chips containing identification information for the keys.

20. The RFID keyboard of claim 17, wherein some keys are associated with letters of an alphabet.

21. The keyboard of claim 17, wherein the keyboard can be rearranged as the user desires.

22. The keyboard of claim 17, wherein the keys are independently movable.

23. The keyboard of claim 17, wherein the keys have an element that biases the secondary antennas away from the first antenna.

24. The keyboard of claim 17, wherein the element is a spring.

* * * * *